(12) United States Patent
Tiesler

(10) Patent No.: US 6,951,362 B2
(45) Date of Patent: Oct. 4, 2005

(54) NON-HANDED PLASTIC SUNVISOR

(75) Inventor: John M. Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/707,428

(22) Filed: Dec. 12, 2003

(65) Prior Publication Data

US 2005/0127704 A1 Jun. 16, 2005

(51) Int. Cl.$^7$ .................................................. B60J 3/00
(52) U.S. Cl. ..................... 296/97.1; 296/97.3; 296/97.5
(58) Field of Search .............................. 296/97.1, 97.2, 296/97.3, 97.5, 97.6, 97.8

(56) References Cited

U.S. PATENT DOCUMENTS

| | | | |
|---|---|---|---|
| 1,515,805 A * | 11/1924 | Brinkman | 296/97.3 |
| 3,128,121 A * | 4/1964 | Greig | 296/97.1 |
| 3,445,135 A * | 5/1969 | Masi | 296/97.3 |
| 3,610,680 A * | 10/1971 | Brady | 296/97.1 |
| 4,362,330 A * | 12/1982 | Cramer | 296/97.3 |
| 4,477,116 A * | 10/1984 | Viertel et al. | 296/97.1 |
| 4,726,620 A * | 2/1988 | Takahashi | 296/97.3 |
| 4,997,228 A | 3/1991 | Kempkers | 296/97.2 |
| 5,011,212 A | 4/1991 | Viertel et al. | 296/97.9 |
| 5,340,186 A | 8/1994 | Aymerich et al. | 296/97.1 |
| 5,678,879 A | 10/1997 | Mailander et al. | 296/97.1 |
| 5,727,837 A | 3/1998 | Viertel | 296/97.1 |
| 6,450,560 B1 * | 9/2002 | Sturt et al. | 296/97.2 |
| 6,513,855 B2 | 2/2003 | Zenisek | 296/97.9 |
| 6,557,920 B1 * | 5/2003 | Hobson et al. | 296/97.1 |

* cited by examiner

Primary Examiner—Stephen Gordon
(74) Attorney, Agent, or Firm—Bruce E Harang

(57) ABSTRACT

Disclosed is a vehicle visor that may be used on either the right side or the left side of a vehicle without the need for side specific parts. The vehicle visor has a textured outer surface requiring no additional finishing covering. The vehicle visor may also provide for the mounting of a vanity mirror or a vanity mirror and light. Thus, the vehicle visor of the present invention is non-handed resulting in cost savings and simplified assembly.

6 Claims, 3 Drawing Sheets

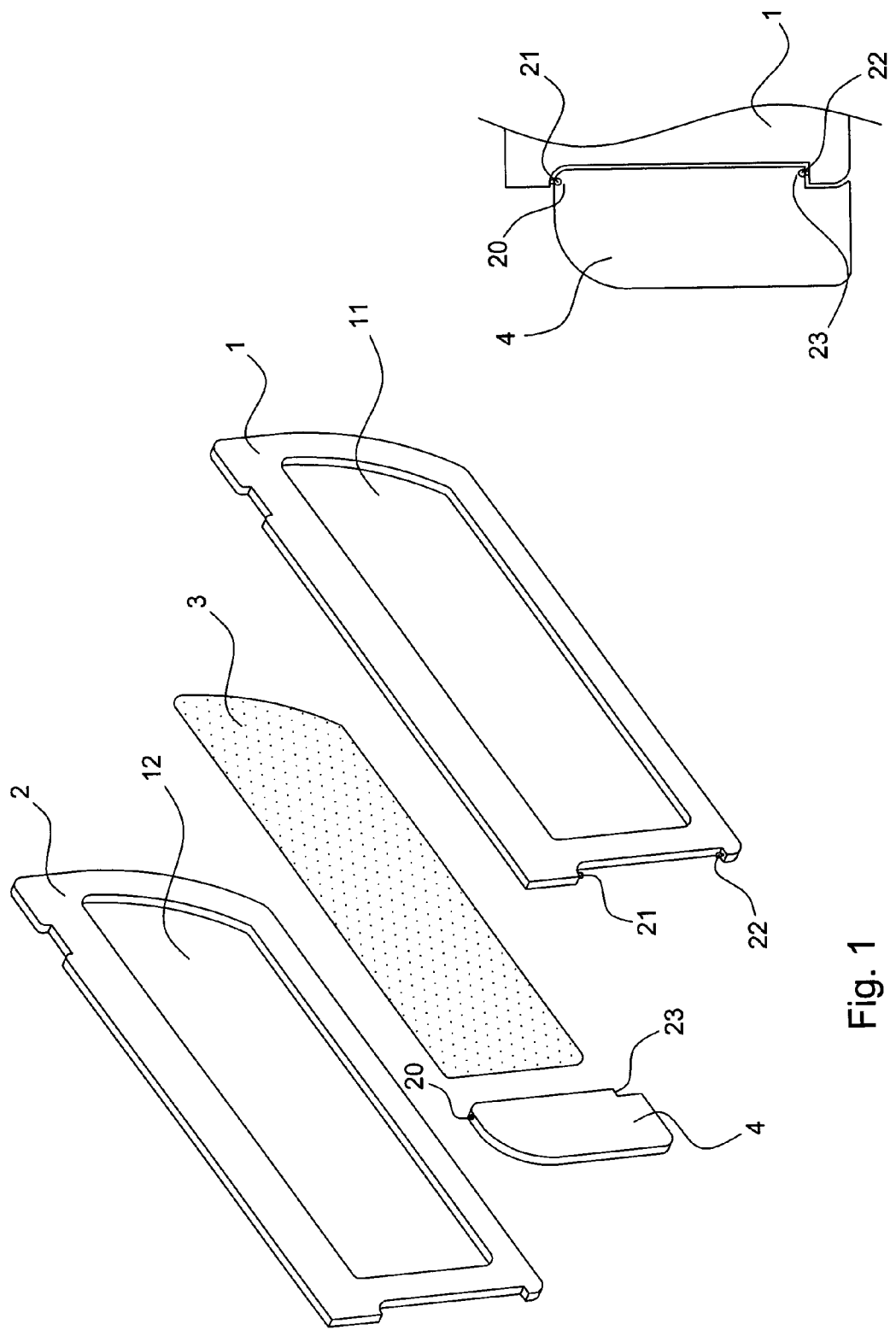

NON-HANDED PLASTIC SUNVISOR

BACKGROUND OF INVENTION

1. Field of the Invention

The present invention generally relates to a vehicle visor and particularly to a non-handed vehicle visor. More particularly the present invention relates to a non-handed vehicle visor allowing for a single set of components to be utilized to produce a vehicle visor for use on either side of a vehicle.

2. Description of the Related Art

A significant portion of the cost of a vehicle visor is the blank visor members being specific for use on one side of a vehicle or the other, i.e., handed visor members. This requires two sets of parts and part dies to provide a visor on both sides of a vehicle. A significant savings would be realized if one set of dies and one set of components would suffice to provide visors that would be suitable for both sides of a vehicle.

For example, U.S. Pat. No. 4,997,228 issued Mar. 5, 1991 to Kempkers teaches an upholstery covered sun visor core suitable for use with or without a mirror or mirror/vanity light assembly.

U.S. Pat. No. 5,011,212 issued Apr. 30, 1991 to Viertel et al teaches a sun visor assembly having a light mounted in a bracket which is separate from the visor body.

U.S. Pat. No. 5,340,186 issued Aug. 23, 1994 to Aymerich et al teaches a sun visor body having a physical attachment means for fixedly attaching a vanity mirror housing to said sun visor body.

U.S. Pat. No. 5,678,879 issued Oct. 21, 1997 to Mailander et al teaches a foam core sandwich construction sun visor substrate for producing an upholstery covered sun visor assembly.

U.S. Pat. No. 5,727,837 issued Mar. 17, 1998 to Viertel teaches a sun visor assembly having a body and an insert containing both the vanity mirror and the sun visor arm attachment means.

U.S. Pat. No. 6,513,855 issued Feb. 4, 2003 to Zenisek teaches a glare shield for use between the left and right sun visors that attaches to the rear view mirror mounting arm.

Thus, there remains a need for a non-handed visor that would be suitable for use on both sides of a vehicle without the need for having two separate sets of components.

DISCLOSURE OF THE INVENTION

The present invention provides advantages and alternatives over the prior art by providing a non-handed vehicle visor utilizing a single set of parts which may be assembled to provide either a right-handed or a left-handed visor. This invention is particularly suitable for visors in which no cover is employed.

A further aspect of the present invention provides for visors with no vanity mirror, visors with a vanity mirror, and visors with both a vanity mirror and one or more vanity lights.

According to yet another aspect of the present invention there is provided a vehicle visor particularly suited to having a textured plastic outer surface requiring no covering.

According to a yet further aspect of the present invention there is provided a vehicle visor having a lighted vanity where the top edge of the vanity bezel is positioned against the bottom of the upper edge of the opening of the frames such that the electrical wiring may be easily hidden between the frames.

According to still another aspect of the present invention there is provided a non-handed visor for use on either side of a vehicle in cooperative combination comprising a frame upper, and a frame lower permanently fixed together; having panel mounted between said frame upper and said frame lower; and an ear moveably mounted on one end of the frame upper; thereby producing a vehicle visor that may be used on either side of a vehicle without the need for side specific parts.

According to still yet another aspect of the present invention there is provided a non-handed visor for use on either side of a vehicle in cooperative combination comprising a frame upper, and a frame lower permanently fixed together; having a panel mounted between said frame upper and said frame lower, said panel having an opening for mounting a vanity mirror assembly; and an ear moveably mounted on one end of the frame upper; thereby producing a vehicle visor that may be used on either side of a vehicle without the need for side specific parts.

According to still yet further aspect of the present invention there is presented a non-handed visor for use on either side of a vehicle in cooperative combination comprising a frame upper, and a frame lower permanently fixed together; having a panel mounted between said frame upper and said frame lower, said panel having an opening for mounting a vanity mirror and vanity light assembly; and an ear moveably mounted on one end of the frame upper; thereby producing a vehicle visor that may be used on either side of a vehicle without the need for side specific parts.

The present invention thus advantageously provides a for a non-handed vehicle visor that is economical to produce and requires fewer parts to provide both right-handed and left-handed visors.

BRIEF DESCRIPTION OF DRAWINGS

FIG. 1 shows an exploded perspective view of one preferred embodiment of the present invention.

FIG. 2 show a plan view of a preferred embodiment of the flexible ear end piece of the visor of the present invention.

DETAILED DESCRIPTION

Figure 3:
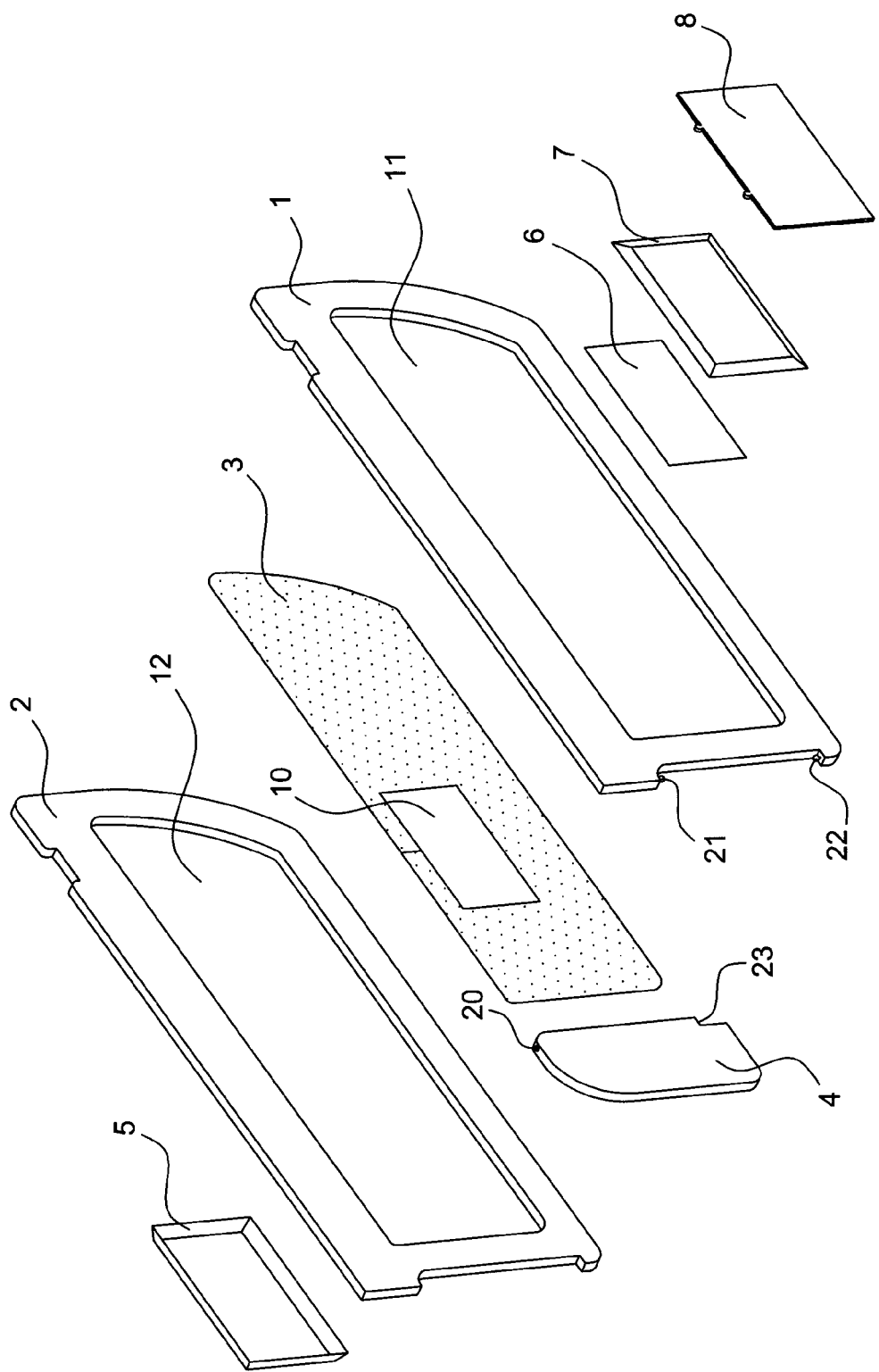
FIG. 3 shows an exploded perspective view of another embodiment of the present invention having a vanity mirror assembly mounted therein.

Reference will now be made to the drawings, wherein to the extent possible like reference numerals are utilized to designate like components throughout the various views. Referring to FIG. 1, which presents an exploded view of one preferred embodiment of the present invention having a frame upper 1 having an opening 11, a frame lower 2 having an opening 12 with a panel 3 located there between.

As further shown in FIG. 1 there is a moveable ear 4 having mounting cavities 20 and 23, moveably mounted to frame upper 1 by way of mounting pins 21 and 22 located on one end of said frame upper 1. The components comprising the vehicle visor once assembled provide a visor that may be used on either side of the vehicle without modification, i.e., the visor is non-handed. By non-handed is meant that the article so described may be use on either the right side or the left side of a vehicle without the requirement of side specific parts.

FIG. 2 shows a plan view of the moveable ear 4 mounted in a partial section of frame upper 1. Frame upper 1 have mounting pins 21 and 22 located therein for snapping into corresponding cavities 20 and 23 located in the edge of moveable ear 4.

Referring now to FIG. 3, there is shown an exploded view of one preferred embodiment of the present invention having a frame upper 1 having an opening 11, a frame lower 2 having an opening 12 with a panel 3 located there between. The panel 3 has an appropriately sized opening 10 located in a desired position for mounting a vanity mirror assembly. The mirror assembly may be any of those well known in the art. A preferred vanity mirror assembly is shown comprising a mirror cover 5 having a mirror 6 mounted therein, a mirror bezel 7 framing said mirror 6 and a mirror lid 8 moveably mounted over said mirror 6 such that it may be positioned in either an open or a closed position. Also shown is ear 4 mountable on one end of frame upper 1. As shown in FIG. 3 the visor becomes a left-hand visor due to the direction of the mirror. To make it a right-hand visor the mirror assembly would be assembled with the mirror facing frame lower 2. The visor members themselves however need no modification in either configuration or assembly.

Figure 4:
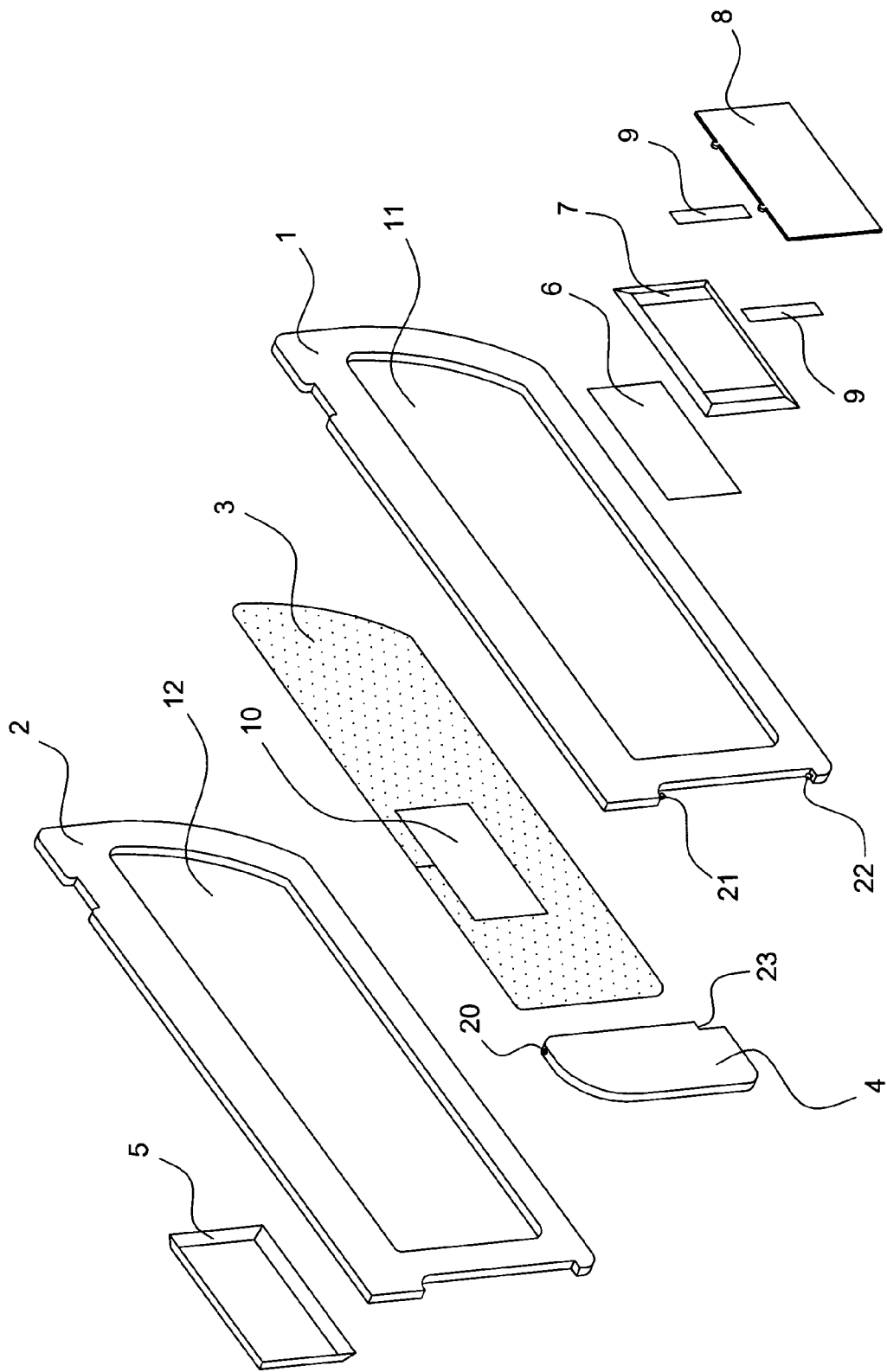
FIG. 4 shows an exploded perspective view of yet another embodiment of the present invention having a vanity mirror assembly also having provision for two vanity mirror lights.

Turning now to FIG. 4, there is shown an exploded view of one preferred embodiment of the present invention having a frame upper 1 having an opening 11, a frame lower 2 having an opening 12 with a panel 3 located there between. The panel 3 has an appropriately sized opening 10 located in a desired position for mounting a vanity mirror assembly. The vanity mirror/lamp assembly may be any of those well known in the art. A preferred vanity mirror/lamp assembly is shown comprising a mirror cover 5 having a mirror 6 mounted therein, a mirror bezel 7 framing said mirror 6 and having provision for mounting a pair of vanity lamps (not shown) and mounting over said vanity lamps lamp lenses 9, and a mirror lid 8 moveably mounted over said mirror 6 and said lamp lenses 9 such that it may be positioned in either an open or a closed position. Also shown is ear 4 mountable on one end of frame upper 1. As shown in FIG. 4 the visor becomes a left-hand visor due to the direction of the mirror. To make it a right-hand visor the mirror assembly would be assembled with the mirror facing frame lower 2. The visor members themselves however need no modification in either configuration or assembly.

The panel 3 may be a solid form but preferably is perforated with a pattern of small holes. The presently preferred panel 3 is a molded perforated plastic having perforations of from about 1.5 mm to about 2 mm with a perforation spacing of about 4 mm. It is also to be understood that panel 3 may be a separate component as shown in the Figures or it may be molded as an integral portion of either frame upper 1 or frame lower 2. The panel 3 is preferably a separate component that is locked between frame upper 1 and frame lower 2 when said frame members are heat welded together.

Frame upper 1, frame lower 2 and ear 4 may be composed of any suitable material well known in the art. Presently preferred is molding said components of polypropylene, high-density polypropylene, ABS, and similar engineered plastics.

Although the preferred embodiments of the present invention has been disclosed, various changes and modifications may be made without departing from the scope of the invention as set forth in the appended claims.

What is claimed is:

1. A non-handed visor for use on a left or right side of a vehicle in cooperative combination comprising:
   a frame upper, and a frame lower permanently fixed together; having
   a panel mounted between said frame upper and said frame lower;
   an ear moveably mounted on one end of the frame upper; and
   a moveable mounting device having an upper and a lower mounting point providing for both mounting of said ear and a hinge allowing movement of said ear;
   thereby producing a vehicle visor that may be used on either of said sides of a vehicle without the need for side specific parts.

2. The non-handed visor as claimed in claim 1 wherein, said frame upper and said frame lower are heat welded together.

3. The non-handed visor as claimed in claim 2 wherein, said panel is fixed between the frame upper and the frame lower during said heat welding.

4. The non-handed visor as claimed in claim 1 wherein, said panel has a plurality of perforations therein.

5. The non-handed visor as claimed in claim 4 wherein, said plurality of perforations are from about 1.5 mm to about 2 mm in diameter and are spaced about 4 mm apart.

6. The non-handed visor as claimed in claim 1 wherein, said visor frame upper, said visor frame lower and said panel have a textured outer surface.

\* \* \* \* \*